(12) United States Patent
Bryant et al.

(10) Patent No.: US 7,870,399 B2
(45) Date of Patent: Jan. 11, 2011

(54) SOFTWARE TRUSTED PLATFORM MODULE AND APPLICATION SECURITY WRAPPER

(75) Inventors: Eric D. Bryant, West Lafayette, IN (US); Avni Harilal Rambhia, West Lafayette, IN (US); Mikhael J. Atallah, West Lafayette, IN (US); John R. Rice, West Lafayette, IN (US)

(73) Assignee: Arxan Defense Systems, West Lafayette, IN (US)

( * ) Notice: Subject to any disclaimer, the term of this patent is extended or adjusted under 35 U.S.C. 154(b) by 1009 days.

(21) Appl. No.: 11/672,054

(22) Filed: Feb. 7, 2007

(65) Prior Publication Data

US 2007/0192864 A1    Aug. 16, 2007

Related U.S. Application Data

(60) Provisional application No. 60/772,370, filed on Feb. 1, 2006.

(51) Int. Cl.
*G06F 11/30* (2006.01)
*H04L 29/06* (2006.01)
*G06F 7/04* (2006.01)

(52) U.S. Cl. .......................... 713/193; 713/190; 726/1; 726/29

(58) Field of Classification Search ................. 713/190; 726/29
See application file for complete search history.

(56) References Cited

U.S. PATENT DOCUMENTS

| | | | |
|---|---|---|---|
| 4,850,019 A | 7/1989 | Shimizu |
| 5,727,062 A | 3/1998 | Ritter |
| 5,757,909 A | 5/1998 | Park |
| 6,011,849 A | 1/2000 | Orrin |
| 6,769,063 B1 | 7/2004 | Kanda |
| 6,834,342 B2 | 12/2004 | Halliday |

(Continued)

FOREIGN PATENT DOCUMENTS

EP    0869635 A2    10/1998

(Continued)

OTHER PUBLICATIONS

Beng-Hong Lim, "Virtualizing the PC Platform," May 1, 2001, www.usenix.org.

(Continued)

*Primary Examiner*—Matthew T Henning
(74) *Attorney, Agent, or Firm*—Taft, Stettinius & Hollister, LLP

(57) ABSTRACT

A software system that transforms an original application into an STPM enabled application and runs the enabled application. At protect time, an anti-tamper tool accepts the original application, uses anti-tamper techniques to create a guarded application, creates a security wrapper according to a policy file, and wraps the guarded application to create the STPM enabled application. A trusted service provider is inserted at the entry point of the enabled application. A set of core services is made accessible to the enabled application through the trusted service provider. At runtime the trusted service provider creates a TSP thread and passes a security file to an STPM device driver implementing TPM functionality and protected by anti-tamper techniques. The TSP thread actively monitors the enabled application and interacts with the STPM device driver through the set of core services.

20 Claims, 4 Drawing Sheets

U.S. PATENT DOCUMENTS

| | | |
|---|---|---|
| 6,853,988 B1 | 2/2005 | Dickinson |
| 6,925,562 B2 | 8/2005 | Gulcu |
| 6,976,166 B2 | 12/2005 | Herley |
| 6,995,692 B2 | 2/2006 | Yokota |
| 7,000,105 B2 | 2/2006 | Tallent, Jr. |
| 2003/0110372 A1 | 6/2003 | Proudler |
| 2003/0231765 A1 | 12/2003 | Tardo |
| 2004/0049687 A1 | 3/2004 | Orsini |
| 2005/0036617 A1 | 2/2005 | Cheng |
| 2005/0060561 A1 | 3/2005 | Pearson |
| 2005/0060568 A1* | 3/2005 | Beresnevichiene et al. .. 713/200 |
| 2005/0086509 A1 | 4/2005 | Ranganathan |
| 2005/0138370 A1 | 6/2005 | Goud |
| 2005/0138384 A1 | 6/2005 | Brickell |
| 2005/0147244 A1 | 7/2005 | Moldovyan |
| 2005/0223221 A1 | 10/2005 | Proudler |
| 2005/0229008 A1 | 10/2005 | Crane |
| 2005/0237821 A1 | 10/2005 | Dekker |
| 2005/0246521 A1 | 11/2005 | Bade |
| 2006/0015946 A1 | 1/2006 | Yagawa |
| 2006/0020781 A1* | 1/2006 | Scarlata et al. .............. 713/100 |
| 2006/0031686 A1 | 2/2006 | Chang et al. |
| 2006/0053277 A1 | 3/2006 | Wang |
| 2006/0053302 A1 | 3/2006 | Yasaki |
| 2006/0101047 A1 | 5/2006 | Rice |
| 2007/0079120 A1* | 4/2007 | Bade et al. .................. 713/166 |

FOREIGN PATENT DOCUMENTS

| | | |
|---|---|---|
| EP | 1076279 A1 | 2/2001 |
| WO | WO2005033914 A1 | 4/2005 |

OTHER PUBLICATIONS

Dorothy E Denning E and Miles E Smid, "Key Escrowing Today," IEEE Communications Magazine, Sep. 1994, pp. 58-68, IEEE.

Manuel Blum, "How to Exchange (Secret) Keys," ACM Trans. on Computer Systems, May 1983, pp. 175-193, vol. 1, No. 2, ACM.

Atallah, Mikhail J et al, "A Survey of Anti-Tamper Technologies," Crosstalk—The Journal of Defense Software Engineering, Nov. 2004, pp. 12-16.

Trusted Computing Group, "Embedded Systems and Trusted Computing Security," Sep. 14, 2005, www.trustedcomputinggroup.org/groups/tpm/embedded_bkgdr_final_sept_14_2005.pdf, pp. 1-4.

Trusted Computing Group, "TCG Software Stack (TSS): Part 1 Commands and Structures," Jan. 6, 2006, Spec. v1.2, level 1.

Trusted Computing Group, "Trusted Platform Modules Strengthen User and Platform Authenticity," Jan. 2005, pp. 1-8.

Trusted Computing Group, "TPM Main: Part 1 Design Principles," Feb. 13, 2005, Spec. v1.2, rev. 85.

* cited by examiner

SOFTWARE TRUSTED PLATFORM MODULE AND APPLICATION SECURITY WRAPPER

CROSS REFERENCE TO RELATED APPLICATIONS

This application claims the benefit of U.S. Provisional Application Ser. No. 60/772,370, filed on Feb. 10, 2006, entitled "Software Root of Trust," which is incorporated herein by reference.

BACKGROUND AND SUMMARY OF THE INVENTION

This invention relates generally to the field of software security, and more specifically to a method and system enabling trustworthy computing without hardware assistance.

A Trusted Platform Module (TPM) specification was created by the Trusted Computing Group (TCG) as an industry specification to create trust in computing platforms. The specification defines a TPM as a microcontroller, a hardware device that stores keys, passwords and digital certificates. However, a need exists for a software system that can provide a similar set of features as those offered by hardware TPMs, but without requiring the presence of a hardware TPM device.

There is also a need for a computer service to enable the same application to run on TPM-enabled and non-TPM-enabled machines with comparable levels of security. There is also a need for an automated protection mechanism to securely insert TPM hooking functionality into legacy applications without dependence on source code, and to safely and strongly bind applications to a TPM. It is preferable for this computer service to enable an application to execute safely by leveraging TPM functionality even when that TPM device did not ship with a secret key pre-programmed; i.e. when the TPM key was provided by the user.

The Software Root of Trust (SRT) is a collection of techniques that enable trustworthy computing without hardware assistance. The SRT provides a "Soft" Trusted Platform Module (STPM) that conforms to the Trusted Computing Group (TCG) specifications for Trusted Platform Modules (TPMs), but exists in software. The SRT provides logical data protection to form a software-created shielded location for processing sensitive data. Thus, whenever the TCG specification dictates a certain type of data must only exist or be processed in a shielded location, it will occur within the software root of trust. The SRT can also provide a secure "bridge" between applications and a hardware TPM, when available.

The STPM is a ubiquitous kernel-level software component that provides an abstraction of hardware TPM technology in order to deliver TPM functionality to devices or systems that may or may not have a physical TPM installed. By providing a similar set of features and interoperability with existing TPM solutions, STPMs enable early adopters to leverage the enhanced security afforded by TPM technology without the additional overhead of building the security in-house and supporting multiple devices. All of the STPM components are compliant with the standards set forth by the Trusted Computing Group (TCG) and provide the following features:

1. License management—allows for monitoring of software usage across the enterprise to ensure compliance with license agreements, usage policies, etc.;
2. Content management—can be used for digital rights management, access control, etc.;
3. Policy management—enforces network access and usage policies, security policies, remediation, etc.;
4. Key management—provides strong key-hiding for applications that need encryption/decryption services;
5. System Integrity services—can be used as an integrity measurement collector to test system state, detect malware, etc.; and
6. Anti-Tamper services—provides applications with external protection or guarding services to deliver strong anti-tamper protection capabilities.

Additional features and advantages of the invention will become apparent to those skilled in the art upon consideration of the following detailed description of exemplary embodiments.

BRIEF DESCRIPTION OF THE FIGURES

Aspects of the present invention are more particularly described below with reference to the following figures, which illustrate exemplary embodiments of the present invention.

DETAILED DESCRIPTION OF EXEMPLARY EMBODIMENTS OF THE INVENTION

Figure 1:
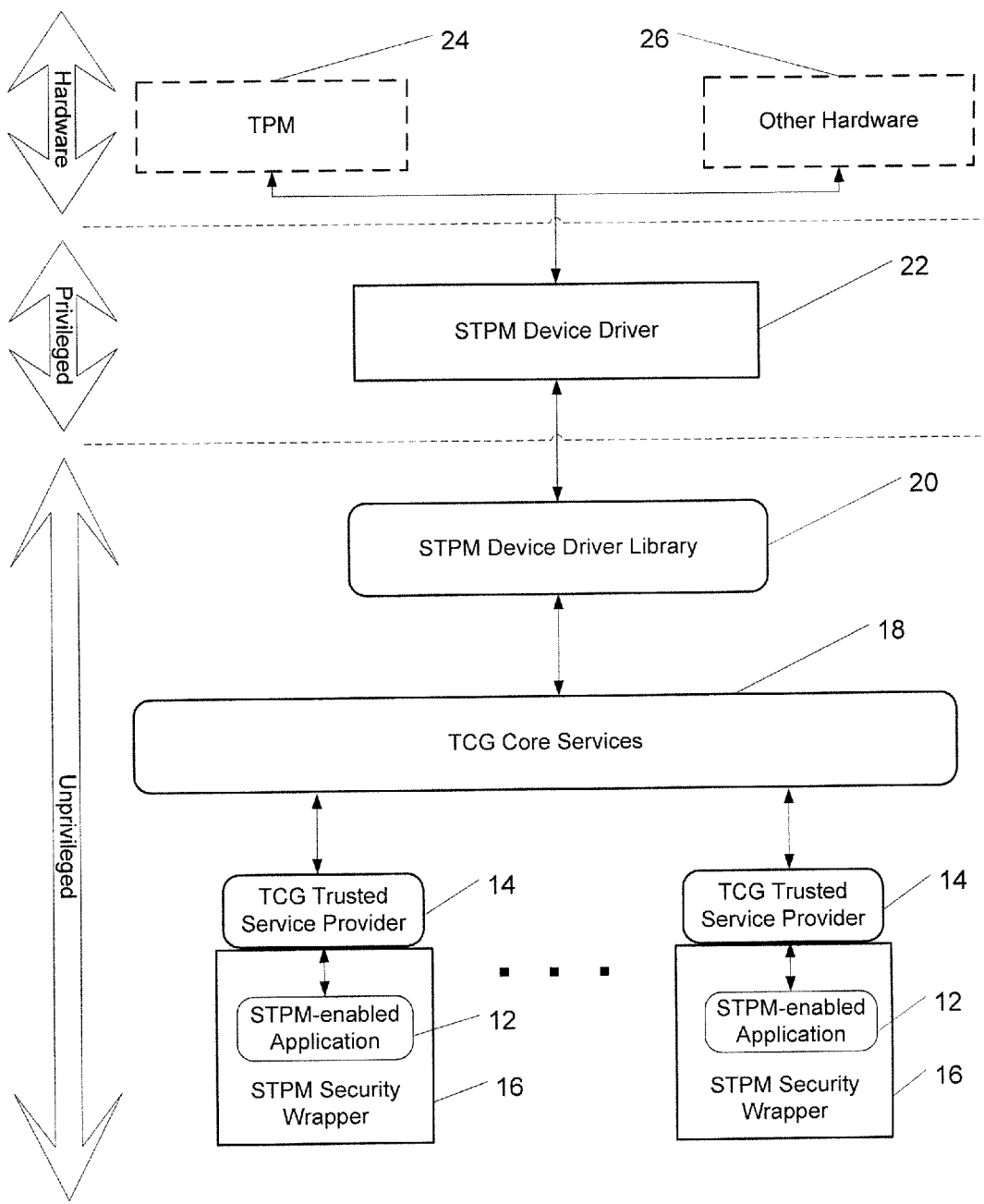
FIG. 1 is a high-level architectural diagram of various components involved with the Soft-Trusted Platform Module (STPM), hardware components being optional.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The Soft-Trusted Platform Module (STPM) provides a software-created, shielded location by operating within a Software Root of Trust (SRT), where TPM protected capabilities may be executed and/or accessed in a secure manner. The Trusted Computing Group (TCG) v1.2 specification for TPM devices defines "protected capability" and "shielded location" as follows:

A protected capability is one whose correct operation is necessary in order for the operation of the TCG Subsystem to be trusted; and A shielded location is an area where data is protected against interference and prying, independent of its form.

With the STPM, protected capabilities are stored in a logically protected form and can be stored outside a physically shielded location if one does not exist. This is essential for the trustworthy operation of TPM services and compliance with the TCG specifications.

FIG. 1 is a block diagram showing STPM-enabled applications 12 along with many of the primary components of the STPM 10 and their relationships. The STPM 10 includes a STPM security wrapper 16, TCG core services 18, an STPM device driver library 20, an STPM device driver 22 and anti-tamper measures, such as guarding and obfuscation techniques, which are used for each component. FIG. 1 also shows the optional TPM hardware 24 and other security hardware 26 that can be utilized by the STPM 10 if they are available to the system. As shown in FIG. 1, an STPM-enabled application 12 is linked with a TCG trusted service provider 14 and wrapped in an STPM security wrapper 16.

Developers of STPM-enabled applications 12 (also known as TCG-aware applications) utilize a TCG trusted service provider 14 application programming interface (API) that exposes a set of TCG functionality to the STPM-enabled application 12. It is through this trusted service provider 14 that an application 12 can access data or services of a specific TPM. The standardization of this trusted service provider API 14 enables development and maintenance of STPM-enabled applications 12 with no or at least less specific expertise in TPM internal technology.

To enable legacy software to reap the benefits of the STPM 10 without going through another development cycle, the trusted service provider 14 functionality can be embedded into the binary application and security policies can be specified through an external file which is dynamically loaded and enforced by the STPM 10. One way of embedding the trusted service provider 14 functionality in the binary application is by using the EnforcIT® tool from Arxan Technologies, Inc.

An STPM-enabled application 12 is wrapped in an STPM security wrapper 16 and linked with the functionality of the trusted service provider 14. The security wrapper 16 is a protective wrapper that can be applied to either legacy or newly developed applications to enable STPM functionality using an anti-tamper tool. A policy file is created by the developer that specifies the security and usage restrictions for the application. At protect time, the anti-tamper tool 36 obfuscates and encrypts the original application code 30 using standard protection techniques and then inserts trusted service provider 14 functionality at the entry point of the STPM-enabled application 12. The trusted service provider 14 functionality includes code to create a trusted service provider (TSP) thread that actively monitors the STPM-enabled application 12 at runtime and interacts with the TCG core services 18. When the STPM-enabled application 12 is executed, the TSP thread is created and the policy file is passed as an argument to the STPM device driver 22. The TSP thread actively protects the STPM-enabled application 12 and interacts with the STPM device driver 22 to provide the desired functionality.

The TCG core services 18 are a set of core services that are made accessible to an application through a service provider. The core services 18 includes many common services that either must or should be shared among the platform's service providers, including content management, key and credential management, event management, and audit management services. The core services 18 provide a common set of services per platform for all service providers. A service provider is any component used by an STPM-enabled application 12 that allows that application 12 access to the core services 18, and thus the STPM 10, from within the application's process. The trusted service provider 14 is one instantiation of a service provider. The TCG Core Services implementation details can be found in the TCG specification for the Trusted Software Stack (TSS).

The STPM device driver library 20 is an intermediate module that exists between the core services 18 and the kernel mode STPM device driver 22. The STPM device driver library 20 provides a user-level interface to the STPM device driver 22.

The STPM device driver 22 is the main kernel-mode application that implements the TCG specified TPM functionality when used as a standalone component, and may utilize a hardware TPM 24 or other security hardware 26 when available. The STPM device driver 22 acts as the primary integrity measurement collector component and can be accessed via API calls or embedded STPM guards in STPM-enabled applications 12 via the trusted service provider 14 and core services 18. The STPM device driver 22 may also be accessed via the network to report system health status as outlined in the TCG Trusted Network Connect specification. The device driver 22 itself is protected by anti-tamper techniques and acts as the root of trust when no hardware TPM is available. The actions taken by the STPM device driver 22 in the event of tampering, failed integrity checks, runtime monitoring tools detected, or policy violations is highly configurable by system administrators and application developers using the protection techniques which are known by those skilled in the art.

According to the Trusted Computing Group specification, the TPM supports the following set of algorithms and operations:

RSA Key Generation
RSA Encryption/Decryption
Secure Hash Algorithm (SHA-1) Hashing
Hashed Message Authentication Code (HMAC)
Random Number Generation
   Entropy source and collector
   State register (SR)
   Mixing function
Internally use symmetric encryption (can be any algorithm)
Data Integrity Register (DIR)
16+ Platform Configuration Registers (PCR)

The STPM 10 supports all of these operations.

Many of these operations are implemented utilizing technology developed and currently patented or patent pending by Arxan Technologies, Inc. The following patents and patent applications of Arxan Technologies, Inc. are hereby incorporated herein by reference: U.S. Pat. No. 6,941,463 issued Sep. 6, 2005 entitled "Secure Computational Outsourcing Techniques"; U.S. Pat. No. 6,957,341 issued Oct. 18, 2005 entitled "Method and System for Secure Computational Outsourcing Disguise"; U.S. Provisional Patent Application No. 60/735,906 filed Nov. 10, 2005 entitled "Method and Apparatus for Hiding a Private Key"; U.S. patent application Ser. No. 11/192,886 filed Jul. 29, 2005 entitled "Method and System for Fortifying Software"; U.S. patent application Ser. No. 10/809,155 filed Mar. 24, 2004 entitled "System and Method for Inserting Security Mechanisms into a Software Program"; and U.S. patent application Ser. No. 11/178,710 filed Jul. 11, 2005 entitled "Combination Guards."

Guards provide the security functionality necessary for STPM-enabled applications 12 to leverage the technology of the STPM 10. One purpose of the STPM guards is to verify the integrity of each module accessed between the STPM-enabled application 12 and the device driver 22. These integrity checks should occur periodically throughout the execution of an STPM-enabled application 12 in a stealthy manner. The integrity checks occur both internal and external to the STPM-enabled application 12, effectively creating a guard network between executable modules in the system. This is similar to the fortified software concept described in U.S. patent application Ser. No. 11/192,886 which is incorporated herein by reference.

In addition to the guards that specifically protect components of the STPM 10, other software tamper proofing or protection techniques will be used to harden each STPM-enabled application 12. These include obfuscation, encryption, anti-debug, and other protection techniques, some of which are disclosed in U.S. patent application Ser. No. 10/809,155 entitled "System and Method for Inserting Security Mechanisms into a Software Program"; and U.S. patent application Ser. No. 11/178,710 entitled "Combination Guards", both of which are incorporated herein by reference.

Figure 2A:
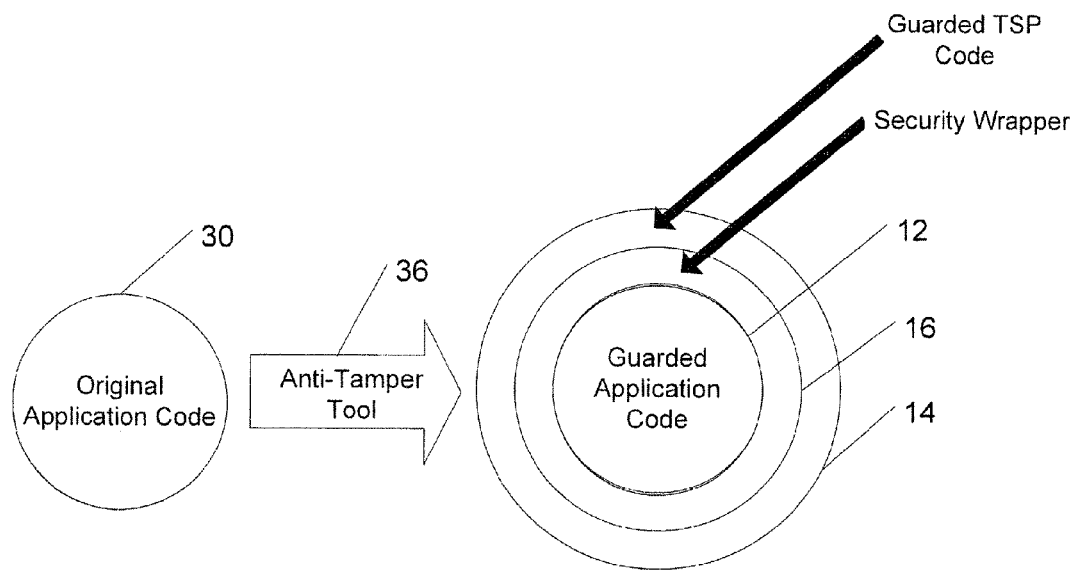
FIG. 2A illustrates a high-level process of applying a software security wrapper to an application.

The security wrapper 16 is a protective wrapper that is applied to STPM-enabled application 12 to enable STPM functionality. FIG. 2A illustrates the implementation of the security wrapper 16. At protect time, an anti-tamper tool 36, such as the EnforcIT® tool of Arxan Technologies, obfuscates and encrypts the application code 30 using standard protection techniques and then inserts functionality of the trusted service provider 14 at the entry point of the STPM-enabled application 12. The trusted service provider 14 functionality contains code to create a thread that actively monitors the STPM-enabled application 12 at runtime and interfaces with the core services 18. The trusted service provider 14 may also perform periodic integrity checks of the running STPM-enabled application 12 for additional security.

Figure 2B:
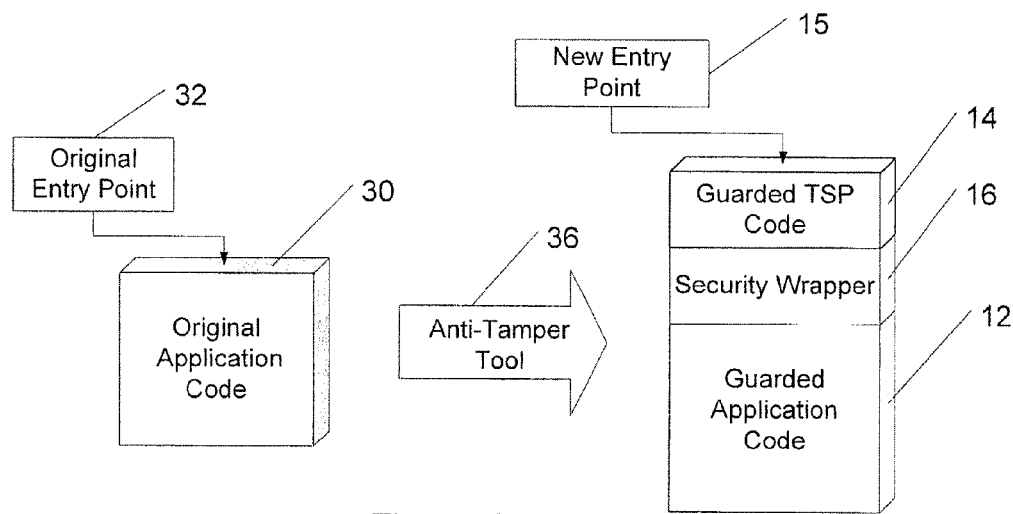
FIG. 2B illustrates a transformation of original application code by an anti-tamper tool.

As shown in FIG. 2A, the result is a piece of code which at the core is the STPM-enabled application 12 that has been encrypted and embedded in the security wrapper 16, and the guarded trusted service provider 14 code is the outermost layer. FIG. 2B illustrates that the original entry point 32 was directly to the original application code 30, but the entry point 15 to the STPM enabled application 12 is through the trusted service provider 14, which activates the TSP thread first, and then through the security wrapper 16 to the STPM-enabled application 12.

There are protection time and runtime components that comprise the security wrapper 16. First, the protector (user) creates a policy file. The policy file specifies security information which can include integrity verification measurements, system health requirements, runtime restrictions, licensing information, or cryptographic keys. The integrity verification measurements can specify ranges of code that should be verified at runtime, the frequency of integrity checks and the actions to take on a failed integrity check. System health requirements can specify any external security-related programs that should be installed and up-to-date on the host PC, such as anti-virus software, firewalls or anti-spyware/adware software. The protector has the option of requiring the presence of the programs or listing them as optional and specifying zero or more actions to take if the programs are not installed and up-to-date. Runtime restrictions are specific restrictions that the protector may impose on the STPM-enabled application 12. These runtime restrictions, enforced at runtime by the device driver 22, can specify types of tools that should not be allowed to run while the STPM-enabled application 12 is running (such as debuggers, emulators or system monitoring tools), or resource restrictions on the STPM-enabled application 12 (such as access to the network, or the ability to create new files). Licensing information can specify the number of simultaneous usages of the STPM-enabled application 12 allowed on an enterprise network, expiration dates and other licensing models that are well known to those skilled in the art. Cryptographic keys can include a private key to decrypt the software, and in the context of content protection, there may be symmetric encryption keys that are stored as well. There is no limitation to the type and quantity of cryptographic keys stored in the policy file. Private keys can be stored using the method described in U.S. Provisional Patent Application No. 60/735,906 entitled "Method and Apparatus for Hiding a Private Key" which is incorporated herein by reference.

After the policy file has been created, the program is protected using the anti-tamper tool 36, see U.S. patent application Ser. No. 10/809,155 entitled "System and Method for Inserting Security Mechanisms into a Software Program" which is also incorporated herein by reference. This can include the following steps:

1. Analyzing the application with the anti-tamper tool;
2. Protecting the application using guarding and protection mechanisms.
   a. Any integrity measurements that must be computed (per the policy file specification) are done at this time and patched into the policy file in the appropriate locations.
3. (Optional) Compressing the application.
4. Generating a public/private key pair and using the public key to encrypt the policy file and application.
5. Individualizing the STPM device driver 22.
   a. Storing the generated public/private key pair in the device driver 22.
   b. Obfuscating the device driver 22.
   c. Inserting any guard instances that are needed to perform the runtime checks specified in the policy file into the device driver 22 and obfuscating. Alternatively, the guarding and protection algorithms may be part of the standard device driver 22, in which case, these algorithms should be obfuscated and additional guards inserted to protect these guards.
6. Inserting the trusted service provider 14 functionality at the entry point of the STPM-enabled application 12. This code should be heavily obfuscated and protected using tamperproofing/guarding mechanisms.

Most of the runtime components are executed from the device driver 22. At the kernel-level, the device driver 22 decrypts the policy file and processes its contents. It hooks the necessary operating system routines to comply with the policy specification and then loads the encrypted STPM-enabled application 12. The STPM-enabled application 12 is decrypted either on-demand or all-at-once, depending on the policy specification, and executed. The device driver 22 invokes the guard instances to perform the runtime security checks on the STPM-enabled application 12 as specified in the policy file. Some of the guards that are inserted into the STPM-enabled application 12 may invoke routines in the trusted service provider 14. The purpose of this is to tightly bind the TSP security thread, the STPM-enabled application 12, and the device driver 22 together to provide a high degree of protection.

The STPM device driver 22 is the primary security component that provides trustworthy computing services to STPM-enabled applications 12. The device driver 22 implements all of the required TPM features as specified by the Trusted Computing Group specification, except the data is kept in a logically protected form at all times.

Figure 3:
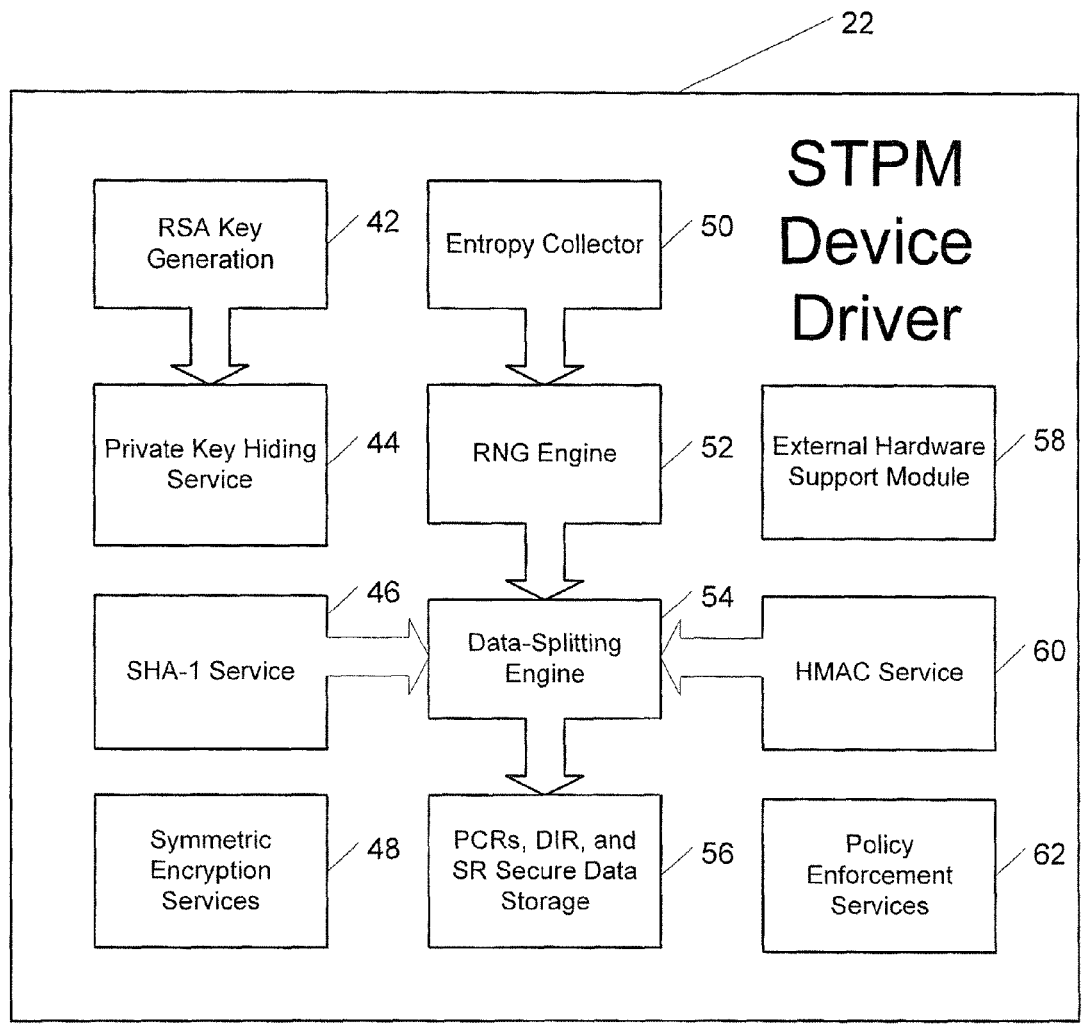
FIG. 3 illustrates components comprising an STPM device driver.

If a hardware TPM 24 is available, then the device driver 22 will utilize the hardware TPM 24 to perform the security computations. The device driver 22 can also work with other external hardware 26 to perform security computations. FIG. 3 is a block diagram of the components of the device driver 22 and the information flow between them. The arrows indicate information flow. So, for example, in the case of random number generation, entropy is collected by the Entropy Collector 50, a random number is generated by the RNG Engine 52, the generated number is split by the Data Splitting Engine 54, and the result stored securely in the state registers of the Secure Data Storage 56.

As described above, a TPM device implements the following set of operations: RSA Key Generation, RSA Encryption/Decryption, Secure Hash Algorithm 1 Hashing, Hashed Message Authentication Code, Random Number Generation, Internal use of Symmetric Encryption, Data Integrity Registers, and Platform Configuration Registers.

The RSA encryption/decryption operations use the RSA Key Generation 42 and the Private Key Hiding Service 44. Some private key hiding techniques are disclosed in U.S. Provisional Patent Application No. 60/735,906 entitled "Method and Apparatus for Hiding a Private Key" which is incorporated herein by reference. RSA keys are generated according to industry standards but the key generation algorithms are obfuscated using protection and guarding techniques.

The SHA-1 Service 46, HMAC Service 60, and Symmetric Encryption Service 48 are implemented according to industry standards using routines known to those skilled in the art. The only difference is that the routines are obfuscated using protection and guarding techniques.

The random number generation is performed using techniques known to those skilled in the art, except for how the internal state is stored in the state registers (SR). The SR, data integrity register (DIR), and platform configuration registers (PCRs) will store data in Secure Data Storage 56 using data obfuscation techniques, such as data-splitting (described below). The important thing to note here is that the internal state of the pseudo-random number generator (PRNG) and computed integrity information will be split by the Data Splitting Engine 54 using the techniques disclosed below and will not appear "in the clear." This is designed to make tampering more difficult by keeping the data in a logically protected form.

The Policy Enforcement Services 62 manage the security policies of the policy file created by the user. The External Hardware Support Module 58 recognizes external hardware available to the STPM Device Driver 22.

Figure 4:
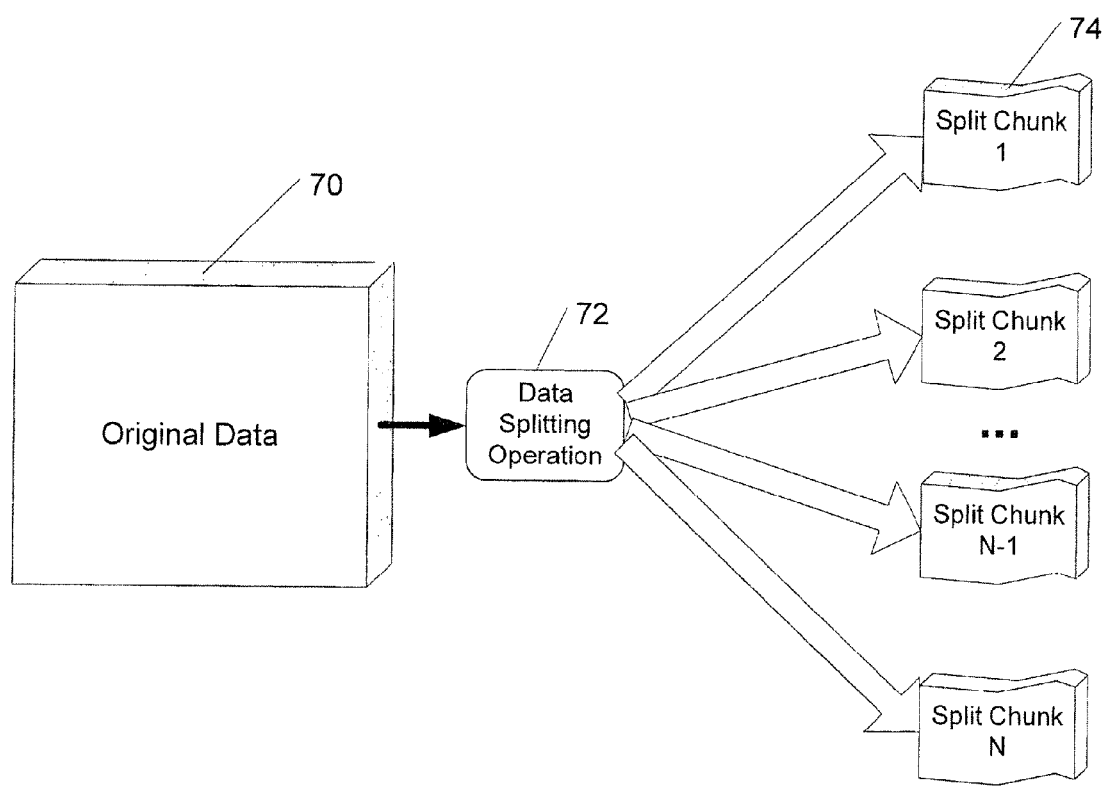
FIG. 4 illustrates a data splitting operation.

FIG. 4 below illustrates the data-splitting operation. The original data 70 undergoes a data splitting operation 72 which splits it into N chunks 74. After the original data 70 has been split into N chunks 74, each chunk 74 is operated on independently in subsequent computations. The attacker must compromise all N chunks 74 to determine the value of the original data 70. The data splitting operation 72 may include one or more splitting techniques.

The area of secure multi-party computation (SMC) implements the idea of algebraically splitting data between multiple parties interacting over a network, where the parties do not trust each other, for the purpose of cooperatively computing a specific function. The computation is performed on split and encrypted data without any party learning anything about the data or the intermediate answers. At the end of the computation, to get the overall answer, the parties have to either exchange their respective shares of the output (or send them to the party who is supposed to know the output). In that context, the data is typically XOR-split and the technique used is a simulation of a circuit by software, in which the circuit implements the cooperatively computed function. This is computationally expensive and is for only one specific function— every function would need its own circuit.

The context we consider differs in that (i) it cannot afford to do the above-mentioned circuit simulations because that would be too slow, especially since there would need to be a different circuit simulated for every function being computed; (ii) it needs to securely mimic a general purpose computer not just a specific function's computation; and (iii) there is the possibility of all but one of the copies being compromised (as opposed to no more than one-third of the parties conspiring in SMC). Our purpose here is to "raise the bar" in a quantifiable way, i.e., to dramatically decrease the probability of a successful attack on the software by the adversary.

We now describe specific methods of achieving higher security, and describe how they can be implemented. To avoid unnecessarily cluttering the description, we henceforth assume the data is split into k chunks, where k=2. We will refer to the two copies of the data that are split as the left half and the right half. There is no loss of generality in the description by using two chunks, as one skilled in the art will recognize that what follows can be generalized to larger values of k. For example, a 3-way split is handled like a 2-way split with one of its sides handled as an additional 2-way split; a 4-way split is handled like a 2-way split with both of its sides handled as additional 2-way splits; etc.

We will begin with the case of additive splitting. Every numerical value X (whether a constant or a computed intermediate value) is not stored in one location: Rather, X is additively split into two random-looking values X' and X" (with X=X'+X") where X' is in the left half and X" is in the right half. If X is Boolean then the splitting is in the XOR sense (addition modulo 2), so that X=X'XOR X". In what follows we continue using the notational convention that primed values (like X', Y', . . . ) reside in the left half, and double-primed values (like X", Y", . . . ) reside in the right half We now describe how the main arithmetic, Boolean, and bit manipulation operations are carried out (i.e., what happens in the left half and in the right half).

Addition: To compute Z=X+Y, the left half does Z'=X'+Y' and the right half does Z"=X"+Y". This implicitly computes Z in additively split form. In software that runs the major modern encryption algorithms, based on computational number theory, addition (as well as all arithmetic) is carried out modulo a large integer: To avoid cluttering the description, we omit the "modulo N" from what follows.

Multiplication: We begin with a theoretical (and known) construct, and then give a more practical construct.

Theoretical: A known method for computing Z=X*Y is as follows. The left half sends the right half E(X') and E(Y') where E denotes homomorphic encryption using the public key; both parties have the public key but only the left half has the private key. The right half generates a random R, computes $$W=E(X')^{Y''}*E(Y')^{X''}*E(R)=E(X'*Y''+Y'*X''+R)$$

and sends W to the left half. The left half decrypts W and obtains $$D(W)=X'*Y''+Y'*X''+R.$$

Finally, the left half sets Z'=X'*Y'+D(W) and the right half sets Z"=X"*Y"−R. Note that, because only the left half can decrypt, there is no exposure of X or Y if only one of the two halves is compromised. The use of homomorphic encryption is better avoided, because it is computationally expensive (i.e., slow).

Practical: We avoid using homomorphic encryption by using a "multiplication helper." The multiplication helper learns nothing about the operands X and Y, about the answer Z, or about the purpose of the multiplication or the software code within which that multiplication is carried out—such code resides in the left and right halves only. For example, to compute Z=X*Y using two helpers H1 and H2, the left half sends to H1 the quantity X', to H2 the quantity Y'; the right half sends to H1 the quantity Y", to H2 the quantity X". Then H1 computes X'*Y" (which looks random), randomly additively splits the product and sends an additive share of it to each of the left and right half. Similarly, H2 computes X"*Y' (which looks random), randomly additively splits the product and sends an additive share of it to each of the left and right half. The left half sets its Z' equal to X'*Y'+its share of X'*Y"+its share of X"*Y', and the right half sets its Z" equal to X"*Y"+its share of X"*Y'+its share of X'*Y". Observe that $$Z'+Z''=X'^*Y'+X'^*Y''+X''^*Y'+X''^*Y''=(X'+X'')^*(Y'+Y'')$$
$$=X^*Y$$

as required. Note that compromise of only one of the helpers gives the adversary random-looking data. Compromise of both helpers gives the actual numbers being multiplied, but this is an event of much lower probability.

Circular Shift: First assume an XOR split for X, so that X=X' XOR X". In that case the left half applies the circular shift to X', and the right half applies it to X", thereby implicitly applying the shift to X. This, however, fails if we assume an additive split for X, i.e., X=X'+X". For example, a circular shift by 1 of the 3-bit representation of X=4 gives a 3-bit representation of 1, but similar shifts applied to X'=2 and X"=2 give (respectively) 4 and 4 which do not add up to 1 (whether arithmetic is modulo 8 or not).

Complementing a Value: Assuming the bit value is XOR-split, it suffices for either the left half or the right half (but not both) to complement their part of that bit. If both complement it then the bit stays the same. Thus, neither half knows when they complement their half of a bit, whether they are carrying out a "do nothing" operation on the bit or are actually complementing the bit.

Setting a bit to 1 (or 0): To set an XOR-split bit value to 1, the left half sets its share of it to 1 and the right half sets its share of it to 0, or vice-versa. To set the XOR-split bit value to 0, they both set their share of it to 1, or they both set their share of it to 0.

XOR: To compute Z=X XOR Y, the left half does Z'=X' XOR Y' and the right half does Z"=X" XOR Y".

Complementing a bit: To complement X, it suffices for either the left half or the right half to complement their share of X (that is, either X' is complemented, or X" is complemented).

AND: The Boolean AND is just multiplication (in a world where arithmetic is modulo 2).

OR: Logical OR follows from XOR and AND using DeMorgan's Law.

Conditional Branching: A predicate (X<C) evaluates to "true" if and only if $$X'+X''<C'+C''$$

which is equal to $$X'-C'<C''-X''$$

Thus, the predicate (X<C) evaluates to "true" if the left half's local X'-C' is less than the right half's local C"-X". The simplest way of achieving this is by the left half sending X'-C' to the right half This does not reveal the individual X' and C' random-looking values, but it does reveal their difference and therefore a compromised right half could reveal X-C (but not X or C). Although there are cryptographic protocols that avoid this potential drawback, they are too expensive in computation time. If k=3 we could use one of the 3 sides solely for the purpose of evaluating such predicates. The first side would compute X'-C', and the second side would compute C"-X". Then the third side would receive the result of X'-C' from the first side, and the result of C"-X" from the second side, and the local task would be to tell the others whether X'-C'<C"-X" (which is the same thing as X<C).

In multiplicative splitting, every numerical value X is multiplicatively split into two random-looking values X' and X" (with X=X'*X"), where X' is in the left half and X" is in the right half, and multiplication is typically modulo a large integer.

Multiplicative splitting makes multiplication easier. To compute Z=X*Y, the left half does Z'=X'*Y' and the right half does Z"=X"*Y". This implicitly computes Z in additively split form. Of course this kind of multiplicative splitting makes addition correspondingly harder. We avoid going through the same detailed listing as for additive splitting, of how various operations are carried out for multiplicative splitting, etc, as they are similar to those we gave above for additive splitting (with the roles of + and * interchanged—e.g., the "practical addition" in this case is similar to the "practical multiplication" described for the additive splitting but with every + replaced by a * and every * replaced by a +).

The following is a specific example of splitting an encryption key where the left and right halves are used in sequence rather than in parallel. Multiplicative splitting is particularly appropriate for protecting (i.e., hiding) the private key in the class of public-key encryption algorithms that are based on modular exponentiation, such as RSA. For the sake of definiteness, we use RSA as the illustrative example in the following discussion. The multiplicative splitting of an RSA key X into X' and X" is done modulo (p−1)*(q−1) where p and q are large primes not known to the adversary. In such a case, the effect of decrypting with a key X is achieved by first having the left half decrypt with X', the outcome of which is next decrypted by the right half using X". The net effect of decrypting with X' then with X" is as if decryption with X had been done.

There are other forms of splitting that can be done. Additive and multiplicative splitting are not the only possibilities, nor even the most appropriate ones in some situations. For example, we could use elliptic curve cryptography, where the algebra involves the group of points on the elliptic curve: There is a public point P, a private key x, and a public point Q=xP. Encryption of a message M is done by selecting a random r and computing the pair rP and M+rQ (which together are the encryption of M). Decryption recovers M by computing x(rP) and subtracting the result from M+rQ, $$M+rQ-x(rP)=M+r(xP)-x(rP)=M,$$

thereby recovering M. In such a situation it is appropriate to split the private key x according to the algebra of addition of points on the elliptic curve.

The present invention has been illustrated and described with reference to certain exemplary embodiments, variations, and applications. The same is to be considered illustrative and not restrictive in character, it being understood that only some exemplary embodiments have been shown and described and that all changes and modifications that come within the spirit of the invention are desired to be protected. The present invention is defined by the appended claims and therefore should not be limited by the described embodiments, variations, and applications.

We claim:

1. A software system that transforms an original application into an STPM enabled application and runs the STPM enabled application, the software system comprising:
   an anti-tamper tool used at protect time for accepting an original application and creating the STPM enabled application, the anti-tamper tool initially implementing anti-tamper techniques on the original application to create a guarded application;

a security wrapper created at protect time by the anti-tamper tool in accordance with a policy file specifying security and usage restrictions for the original application, the security wrapper wrapping the guarded application to create the STPM enabled application;

a trusted service provider inserted at protect time by the anti-tamper tool at the entry point of the STPM enabled application;

a set of core services made accessible to the STPM enabled application through the trusted service provider;

an STPM device driver implementing trusted platform module functionality, the STPM device driver being protected by anti-tamper techniques; and a processor for executing the STPM enabled application;

wherein at runtime the trusted service provider creates a TSP thread and passes a security file based on the policy file to the STPM device driver, the TSP thread actively monitoring the enabled application and interacting with the STPM device driver through the set of core services.

2. The software system of claim 1, wherein the anti-tamper tool inserts guards into the original application, and obfuscates and encrypts parts or all of the original application.

3. The software system of claim 1, wherein the device driver utilizes TPM hardware or other security hardware when it is available.

4. The software system of claim 1, wherein the trusted service provider is standardized for use with a variety of STPM enabled applications.

5. The software system of claim 1, wherein the STPM enabled application is a legacy application available as binary code, and the trusted service provider is embedded in the binary code of the legacy application, and the security policy are specified in an external file enforced by the STPM device driver.

6. The software system of claim 1, wherein when the set of core services includes one or more of content management services, key management services, credential management services, event management services, and audit management services.

7. The software system of claim 1, further comprising a plurality of enabled applications and a plurality of trusted service providers, each enabled application having an associated trusted service provider; and wherein the set of core services provides common services to all of the plurality of trusted service providers.

8. The software system of claim 1, wherein the STPM device driver can be accessed by a network to report system health status.

9. The software system of claim 1, wherein the STPM device driver implements one or more of RSA key generation, RSA encryption and decryption, Secure Hash Algorithm (SHA-1) hashing, Hashed Message Authentication Code (HMAC), random number generation, internal use of symmetric encryption, data integrity registers, state registers and platform configuration registers.

10. The software system of claim 1, wherein the STPM device driver takes an action according to the policy file when violations of the security file are detected, the action being configurable.

11. The software system of claim 1, wherein integrity checks are performed periodically during the execution of the enabled application according to the policy file.

12. The software system of claim 11, wherein the integrity checks are performed both internal and external to the enabled application according to the policy file.

13. The software system of claim 1, wherein the policy file specifies security information which includes one or more of integrity verification measurements, system health requirements, runtime restrictions, licensing restrictions, or cryptographic keys.

14. A method of transforming an original application into an STPM enabled application and executing the STPM enabled application in a software system, the method comprising at protect time:

accepting the original application and a policy file specifying security and usage restrictions;

analyzing the original application with an anti-tamper tool;

protecting the original application using anti-tamper techniques;

generating a public key and private key pair;

encrypting the protected application and the policy file using the public key; and wrapping the encrypted application and policy file in a security wrapper;

inserting trusted service provider functionality at the entry point of the wrapped application to create the STPM enabled application;

and the method further comprising at runtime a processor:

creating a trusted service provider thread;

passing the encrypted policy file to an STPM device driver;

decrypting the policy file and processing its contents in the STPM device driver;

loading the encrypted STPM enabled application;

executing the STPM enabled application in accordance with the policy file.

15. The method of claim 14, wherein the STPM enabled application is decrypted on-demand during execution of the STPM enabled application.

16. The method of claim 14, wherein the STPM enabled application is decrypted in its entirety prior to execution of the STPM enabled application.

17. The method of claim 14, wherein the STPM enabled application is decrypted on-demand during execution or decrypted in its entirety prior to execution depending on the contents of the policy file.

18. The method of claim 14, wherein the STPM device driver stores data in secure data storage registers using data splitting techniques comprising:

splitting the data into N chunks, storing each chunk in a separate secure data register;

performing computations with the data by:

operating on each of the N data chunks independently;

and combining the results of the independent operations to arrive at the result of the computation.

19. The method of claim 18, wherein the data splitting techniques use additive splitting techniques.

20. The method of claim 18, wherein the data splitting techniques use multiplicative splitting techniques.

* * * * *